(12) United States Patent
Takeda et al.

(10) Patent No.: US 7,361,696 B2
(45) Date of Patent: Apr. 22, 2008

(54) 1,4-DISUBSTITUTED DIACETYLINE POLYMER AND PROCESS FOR PRODUCING THE SAME

(75) Inventors: Kenji Takeda, Tokyo (JP); Makoto Gonokami, Tokyo (JP)

(73) Assignee: Japan Science and Technology Corporation, Saitama (JP)

( * ) Notice: Subject to any disclaimer, the term of this patent is extended or adjusted under 35 U.S.C. 154(b) by 334 days.

(21) Appl. No.: 10/525,351

(22) PCT Filed: Nov. 5, 2002

(86) PCT No.: PCT/JP02/11534

§ 371 (c)(1),
(2), (4) Date: Feb. 23, 2005

(87) PCT Pub. No.: WO2004/026924

PCT Pub. Date: Apr. 1, 2004

(65) Prior Publication Data

US 2005/0215658 A1 Sep. 29, 2005

(30) Foreign Application Priority Data

Aug. 29, 2002 (JP) .............................. 2002-249950

(51) Int. Cl.
*C08F 2/48* (2006.01)
*C08J 2/38* (2006.01)
(52) U.S. Cl. .................... 522/2; 522/98; 522/150; 522/152; 522/157; 522/158; 522/178; 522/180; 522/161; 522/184; 522/913; 522/912; 522/189; 522/186; 523/300; 264/405; 204/157.15; 204/157.6; 204/157.61; 204/157.98
(58) Field of Classification Search ................ 522/150, 522/151, 154, 157, 158, 160, 161, 184, 180, 522/178, 173, 174, 186, 189, 913, 912, 2; 523/300; 264/405; 526/922; 204/157.15, 204/157.6, 157.61, 157.98
See application file for complete search history.

(56) References Cited

U.S. PATENT DOCUMENTS 4,640,960 A * 2/1987 Leyrer et al. ................ 525/388

FOREIGN PATENT DOCUMENTS

| JP | 2-152942 | 6/1990 |
|----|----------|--------|
| JP | 6-306040 | 11/1994 |

OTHER PUBLICATIONS

Wenz et al. Molecular Weight Distribution and Solution Properties of a Poly(Diacetylene). Dei Makromolekulare Chemie, Rapid Commincations. 3(4), 231-237 (Apr. 2, 1982). [online], [retrieved on Mar. 14, 2007], Retrieved from the Internet < http://www3.interscience.wiley.com/cgi-bin/jissue/104078783>.*

* cited by examiner

*Primary Examiner*—Sanza L McClendon
(74) *Attorney, Agent, or Firm*—Richard M. Goldberg

(57) ABSTRACT

A 1,4-di-substituted diacetylene polymer that is soluble in organic solvent, is composed of a repeating unit represented by the general formula $=CR-C\equiv C-CR'=$ (wherein, R and R' represent identical or different monovalent organic substituents), and has an average degree of polymerization of 4 to 200 and a ratio (Mw/Mn) of weight average molecular weight (Mw) to number average molecular weight corresponding to said average degree of polymerization (Mn) of 1.1 to 5.0, and a process for producing the 1,4-di-substituted diacetylene polymer by irradiating a solution of the soluble 1,4-di-substituted diacetylene polymer with laser light having a wavelength within the range of 250 to 1,200 nm, and preferably 550 to 900 nm, to cause a photodegradation reaction of said polymer, or heating a solution of the soluble 1,4-di-substituted diacetylene polymer to a temperature of 100 to 300° C. to cause thermal degradation of said polymer; and 1,4-di-substituted diacetylene polymers for which the average degree of polymerization and molecular weight distribution are controlled to within predetermined ranges, a production process that enables that control, useful composite compositions based on the 1,4-di-substituted diacetylene polymers, and constitutions of materials in which said composite compositions are used.

23 Claims, 7 Drawing Sheets

1,4-DISUBSTITUTED DIACETYLINE POLYMER AND PROCESS FOR PRODUCING THE SAME

TECHNICAL FIELD

The present invention relates to 1,4-di-substituted diacetylene polymers realized by controlling the average degree of polymerization, number average molecular weight corresponding to said average degree of polymerization, and molecular weight distribution based on the weight average molecular weight, and their production process.

BACKGROUND OF THE INVENTION

Polymers (referred to as polydiacetylenes) obtained by solid-state polymerization of 1,4-di-substituted diacetylene monomers (R—C≡C—C≡C—R': wherein, R and R' represent identical or different monovalent organic substituents) have a main chain structure consisting of a repeating unit in the form of =CR—C≡C—CR'=, and form macromolecules having a molecular weight on the order of several million.

Although polydiacetylenes are characterized by the main chain having a fully conjugated, extended chain structure, they have also attracted much attention from the view point of optically active materials, such as an extremely large third order non-linear optical susceptibility [$X^{(3)}=10^{-9}$ to $10^{-10}$ esu, C. Sauteret et al., Phys. Rev. Lett., 36, 956 (1976)], and photo-induced-phase transition phenomena [S. Koshihara et al., J. Chem. Phys., 92, 7581 (1990)] based on excitons of the conjugated n-electron system of the main chain.

However, the majority of common polydiacetylenes are insoluble in solvent due to the rigidity of the main chains, and since they also decompose without melting when heated, it has been essentially impossible to measure their molecular weight, molecular weight distribution and other solution properties.

In contrast, in the case of 1,4-di-substituted diacetylene polymers containing such long side chains as flexible and easily solvated substituents in the form of R and R' in the aforementioned repeating unit (for example, in the case in which R and R' represent ($CH_2)_4OCONHCH_2COOC_2H_5$), molecular weight, molecular weight distribution and other solution properties can be measured on an exceptional case due to being soluble in polar solvents.

However, there has of yet been no research nor development conducted with an intention to control the average degree of polymerization, and the molecular weight distribution even for those soluble polydiacetylenes, thus no sample of 1,4-di-substituted diacetylene polymers based on said control is near at hand.

One of the technical background factors behind these circumstances is as follows. In the case of polyaddition reactions of common olefin monomers, molecular weight of polymers can be controlled by the amount of the initiator against the monomer, and such a control is also possible for polycondensation reaction of polyesters, polyamides and so forth by changing the relative ratio of the reactants.

In contrast, polymerization of diacetylene compounds is quite unique in the sense that polymerization initiates without any common initiators, but by the external stimulation such as high energy beams, UV-light, shear stress, thermal treatment and so forth.

The cause of this difficulty in controlling molecular weight and molecular weight distribution is that, in the case of solid phase polymerization of diacetylene compounds, in addition to being unable to specify the concentration of the active sites of polymerization, since no initiator is added on purpose. In addition, propagation proceeds very rapidly via chain reaction, high molecular weight polymers are present in the unreacted monomer phase in the solid solution state even in the very early stages of the reaction, thereby making it impossible to isolate low molecular weight oligomers in a good yield.

This is also the case even for polydiacetylenes having molecular weights ranging from ten thousand to several million.

Incidentally, although the relationship between polymer conversion rate of diacetylene compound [substituent R=R'=($CH_2)_4OSO_2C_6H_4CH_3$] and molecular weight has been described (G. Wenz et al., Mol. Cryst. Liq. Cryst. 96, 99 (1983)), as shown in FIG. 1, in the state of a conversion rate of 0.2%, namely when 99.8% of the monomer still remains, the molecular weight of the formed polymer is already within the range of 10,000 to 100,000, and at a conversion rate of 4.5%, the molecular weight covers a continuous, wide distribution from several ten thousands to several million.

Moreover, at a conversion rate of 42% or higher, the product consists primarily of only polymers having high molecular weights ranging from several hundred thousands to several million.

On the basis of such experimental results, the selective and efficient preparation of diacetylene polymers in which molecular weight and molecular weight distribution are controlled has been judged to be extremely difficult during the course of the polymerization reaction with respect to polydiacetylenes.

On the other hand, in the aspect of practical use, materials made from polydiacetylenes have been evaluated as being conjugated polymers having extremely large third order non-linear optical susceptibility as well as other superior characteristics.

However, since polydiacetylenes happen to cause light scattering due to the phase separation in a matrix material based on the rigidity of the main chains, improvement of their processability has been desired.

In consideration of the circumstances surrounding polydiacetylenes as described above, the object of the present invention is to provide a production process of 1,4-di-substituted diacetylene polymers by controlling the average degree of polymerization and molecular weight distribution within predetermined ranges, 1,4-diacetylene polymers according to said production processes, useful compositions based on the 1,4-di-disubstituted diacetylene polymers, and constitutions of a member that uses said compositions.

DISCLOSURE OF THE INVENTION

The production process according to the present invention having for its object to solve the aforementioned problems is composed of 1,4-di-substituted diacetylene polymer that is soluble in an organic solvent, composed of a repeating unit represented by the general formula =CR—C≡C—CR'=, (wherein R and R' represent identical or different monovalent organic substituents,) and has an average degree of polymerization of 4 to 200 and a ratio (Mw/Mn) of weight average molecular weight (Mw) to number average molecular weight corresponding to said average degree of polymerization (Mn) of 1.1 to 5.0.

The substituents R and R' preferably the monovalent organic groups indicated below:

$(CH_2)_m OCONHCH_2 COOC_n H_{2n+1}$ (wherein m represents an integer within the range of 3 to 6, and n represents an integer within the range of 1 to 10), $(CH_2)_m CONHCH_2 COOC_n H_{2n+1}$ (wherein m represents an integer within the range of 3 to 6, and n represents an integer within the range of 1 to 10), $(CH_2)_m OSO_2 C_6 H_4 CH_3$ (wherein m represents an integer within the range of 3 to 6), and $(CH_2)_m OCONHCH_2 CONHC_n H_{2n+1}$ (wherein m represents an integer within the range of 3 to 6, and n represents an integer within the range of 1 to 10).

The aforementioned 1,4-di-substituted diacetylene polymers according to the present invention (referred to as the "present polymer") can be produced by:

(1) irradiating a solution of soluble 1,4-di-substituted diacetylene polymer with laser light having a wavelength within the range of 250 to 1200 nm, and preferably 550 to 900 nm, to cause a photodegradation reaction of said polymer, wherein the irradiation time is from 10 seconds to 180 minutes, or (2) heating a solution of 1,4-di-substituted diacetylene polymer to a temperature of 100 to 300° C. to cause thermal degradation of said polymer, wherein heating time is from 30 minutes to 5 hours.

Namely, polymers can be produced having an average degree of polymerization within the range of 4 to 200, and in which the ratio (Mw/Mn) of weight average molecular weight (Mw) to number average molecular weight (Mn) can be controlled to within the range of 1.1 to 5.0 based on photodegradation or thermal degradation of 1,4-di-substituted diacetylene polymer as described in the aforementioned methods of (1) or (2).

BEST MODE FOR CARRYING OUT THE INVENTION

Figure 1:
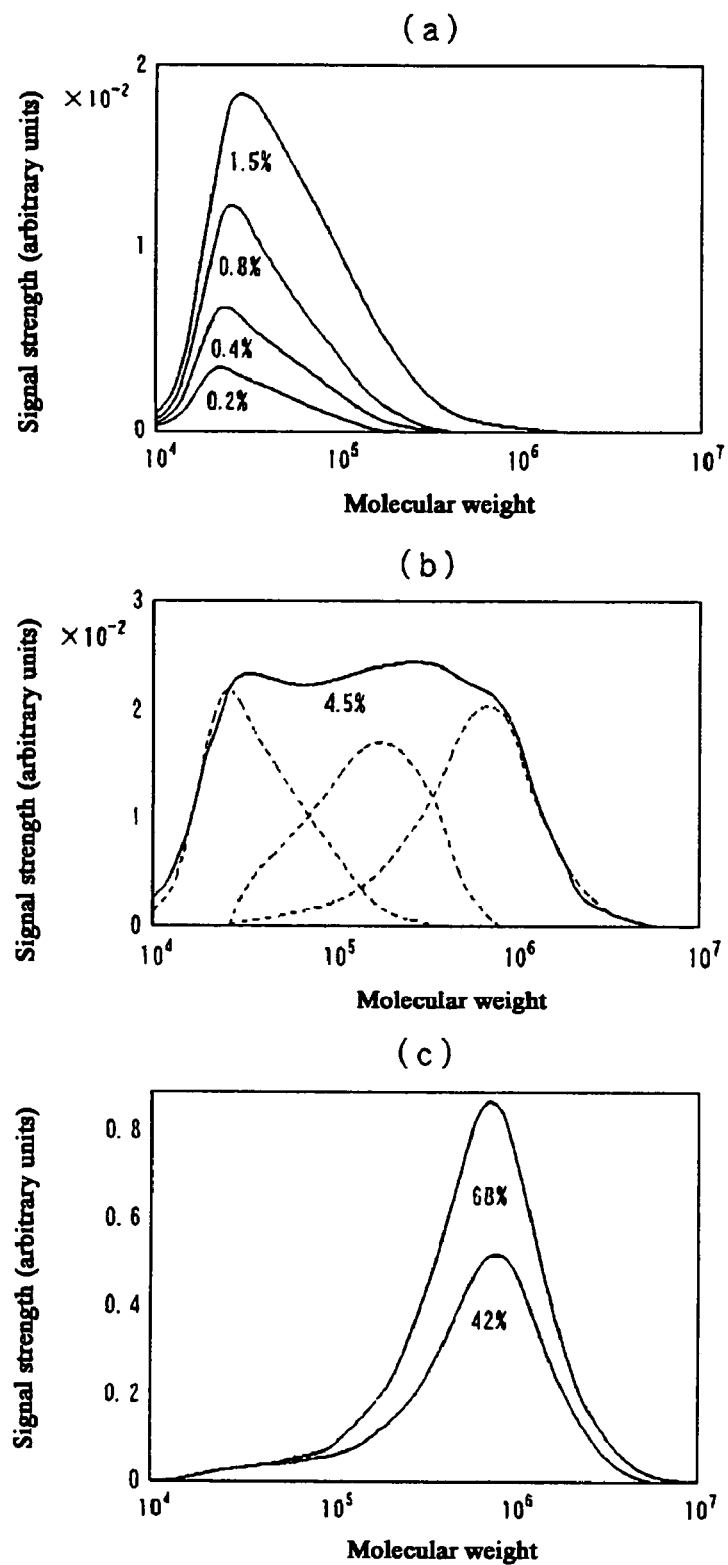
FIG. 1 shows the relationship between polymer conversion rate and molecular weight distribution during the course of solid phase polymerization of polydiacetylene.

Specific mode for carrying out the production according to the aforementioned (1) and (2) are as shown below.

(1) Providing of 1,4-di-substituted diacetylene monomer: Crystals of monomers of 1,4-di-substituted diacetylene are provided in which the organic substituent groups bonded to positions 1 and 4 are monovalent organic groups so as to enable preparation of the polymer described in claim 1.

(2) Production of 1,4-di-substituted diacetylene polymers: The crystals of 1,4-di-substituted diacetylenes described in (1) are either irradiated at room temperature with 30 to 50 Mrad of gamma rays from cobalt 60 as the radiation source, or the aforementioned monomer crystals are held at a temperature 5 to 10 degrees lower than the melting point, to form a 1,4-di-substituted diacetylene polymer at a conversion rate of 95% and having an average degree of polymerization of 2,000 or more (and in most cases, the corresponding number average molecular weight is 1 million or more).

At that time, the remaining monomers can be extracted with acetone followed by vacuum drying in a desiccator to obtain a sample from the 1,4-di-substituted diacetylene polymers.

(3) Preparation of 1,4-di-substituted diacetylene polymer solution: The 1,4-di-substituted diacetylene polymer obtained according to the process of (2) is dissolved in a polar solvent, and preferably a halogen-based solvent such as chloroform, trichloroethane or tetrachloroethane, or dimethylformamide, dimethyl sulfoxide, dimethylacetamide or 1-methyl-2-pyrrolidone to a concentration of 10 to 500 mg/100 ml, and preferably 50 to 200 mg/100 ml to obtain a 1,4-di-substituted diacetylene polymer solution.

(4-1) Photodegradation reaction of polydiacetylenes: A reaction vessel containing a polydiacetylene solution prepared in (3) is irradiated with laser light at room temperature to carry out a photodegradation reaction of the polydiacetylene.

The reaction vessel is preferably a quartz or hard glass cell having an optical path length of 10 to 100 mm, diameter of the light receiving surface of 3.5 to 10.0 mm and volume of 0.1 to 1.0 ml, and in the case of carrying out the reaction in large volume, a reaction vessel is used that is provided with a circulating flow cell or solution reservoir equipped with a stirrer. A pulse laser, and preferably a wavelength-tunable femtosecond laser comprised of the combination of a regenerative amplifier and a parametric oscillator, is used for the laser serving as the light source, and a beam expanding lens is used in the case it is necessary to align the beam diameter with the diameter of the light receiving surface of the reaction vessel.

The light intensity at the light receiving surface is set to a specific intensity within the range of 10 to 350 mW with a dimming filter while measuring with a power meter.

The present polymer can be obtained by setting the wavelength of the radiated laser light within the range of 250 to 1,200 nm. Degradation of polydiacetylenes is difficult to occur, if the wavelength is out of this range.

The wavelength region of 550 to 900 nm is transparent for single photon absorption by polydiacetylenes, and the degradation reaction considered to be caused by absorption of two photons proceeds uniformly in the direction of the optical path within the reaction vessel, thereby facilitating the formation of a mono-dispersed degradation product having an average degree of polymerization of 4 to 6 and decomposition degree (Mw/Mn) within the range of 1.1 to 2.0.

In contrast, in the case of irradiation with laser light having a wavelength region of 250 to 550 nm, the reaction occurs only near the light receiving surface of the reaction vessel due to the strong absorption of polydiacetylenes, thereby causing the reaction to become non-uniform in the direction of the optical path length, and causing a tendency to be observed in which the composition of the reaction product is poly-dispersed instead of being mono-dispersed.

On the other hand, in the case of irradiation with laser light having a wavelength band in excess of 900 nm, the degradation reaction proceeds more slowly than in the case of a wavelength region of 550 to 900 nm, and a tendency is observed in which the dispersivity (Mw/Mn) becomes excessively large.

Thus, the preferable wavelength region in the aforementioned method of (1) is 550 to 900 nm.

In the aforementioned method of (1), it is necessary for the radiation time of the laser light that causes the photodegradation reaction of 1,4-di-substituted diacetylene polymer to be set to within a predetermined range.

More specifically, the radiation time should be set while referring to the intensity of the laser light, concentration of the polymer solution, volume of the reaction vessel, average degree of polymerization of the desired polymer, namely the number average molecular weight corresponding to said average degree of polymerization, and the measurement results of gel permeation chromatography (GPC) corresponding to the molecular weight distribution.

However, in most cases, the radiation time is selected to be within the range of 10 seconds to 300 minutes (5 hours).

(4-2) Thermal Degradation Reaction of Polydiacetylenes:

The present polymer can be obtained by placing a 1,4-di-substituted diacetylene polymer solution prepared in (3) in a sealed glass tube or glass vessel with stopper and causing thermal degradation by holding for 30 to 300 minutes in a silicone oil bath heated to a temperature of 100° C. to 300° C.

Measurement of the number average molecular weight corresponding to the average degree of polymerization and measurement of molecular weight distribution of the present polymers obtained by the photodegradation reaction of (4-1) or the thermal degradation of (4-2) should be carried out using a commercially available GPC measuring system (for example, a GPC measuring system manufactured by Hitachi, Ltd., column: GPC K-805 or GPC K-804 manufactured by Showa Denko).

Figure 2:
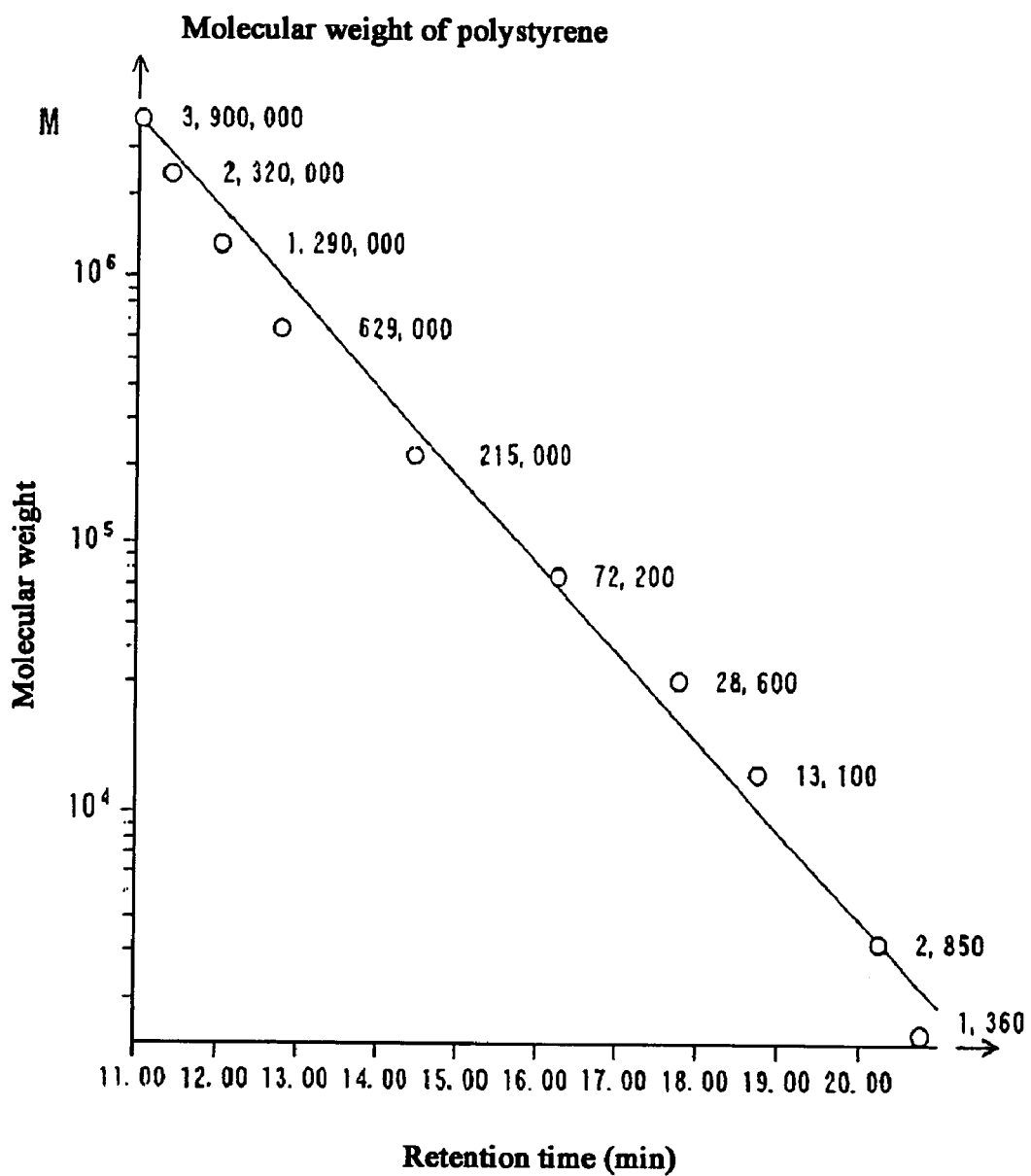
FIG. 2 shows the relationship between GPC retention time and molecular weight prepared using mono-dispersed polystyrene standard samples.

More specifically, after measuring the weight average molecular weight (Mw) and number average molecular weight (Mn) of the polydiacetylene degradation products based on a calibration curve as shown in FIG. 2 prepared by GPC measurement of ten types of mono-dispersed polystyrene standard samples having different molecular weights (Showa Denko), the average degree of polymerization is calculated by dividing the number average molecular weight (Mn) by the molecular weight of the 1,4-di-substituted diacetylene monomers, and then calculating the molecular weight distribution according to the ratio of Mw/Mn.

Normally, the measuring wavelength of the aforementioned GPC is preferably 350 nm.

According to this measurement method, present polymer obtained by the photodegradation reaction of (4-1) and present polymer obtained by thermal degradation according to (4-2) can both be confirmed to have an average degree of polymerization within the range of 4 to 200 and a molecular weight distribution within the range of 1.1 to 5.0.

In this manner, in the present polymers, together with controlling the average degree of polymerization to within a predetermined range, molecular weight distribution is also controlled to within a predetermined range. Consequently, in comparison with the case of polydiacetylenes of the prior art having an extremely large molecular weight and large molecular weight distribution, the present polymer can be expected to demonstrate improved processability due to less deviation in its physical and chemical characteristics.

Similar to polydiacetylenes of the prior art, the present polymer has superior optical characteristics such as non-linear optical susceptibility, and has particularly superior transmittance.

The following provides an explanation of obtaining composite compositions based on the present polymer and other materials.

Composite compositions consisting of the present polymer and other transparent resins can be obtained by dissolving a present polymer in a polar solvent such as 1-methyl-2-pyrrolidone and mutually dissolving with a transparent resin such as an aromatic vinyl resin, acrylic resin, polyester, polycarbonate, polyurethane, polyamide, polysulfone, polycyclopentadiene, photosetting resin or thermosetting resin.

Similarly, composite compositions can be prepared by adding an inorganic polymer, obtained in a polycondensation reaction of a metal alkoxide typically represented by alkoxysilane, to the present polymer.

Although these compositions can be fabricated into films, sheets and three-dimensional moldings, these moldings can be used as optical parts based on their satisfactory optical transmittance, which is one of the properties of the present polymers. Moreover, these compositions can be formed as a surface layer on other materials to obtain optical parts based on their favorable optical transmittance.

Specific examples of optical parts using these composite compositions include transparent substrates, microspherical resonators and optical waveguides.

Among the aforementioned optical parts, the formation of each of the aforementioned composite compositions in the form of a surface layer on glass or quartz transparent substrates or glass microspheres should be carried out by applying said composite composition by spin coating, dipping and so forth followed by curing by heating at a temperature of 100° C. to 200° C.

EXPERIMENTAL EXAMPLES

The following provides an explanation of experimental examples verifying the formation of the present polymer based on each of the drawings.

Experimental Example 1

Figure 3:
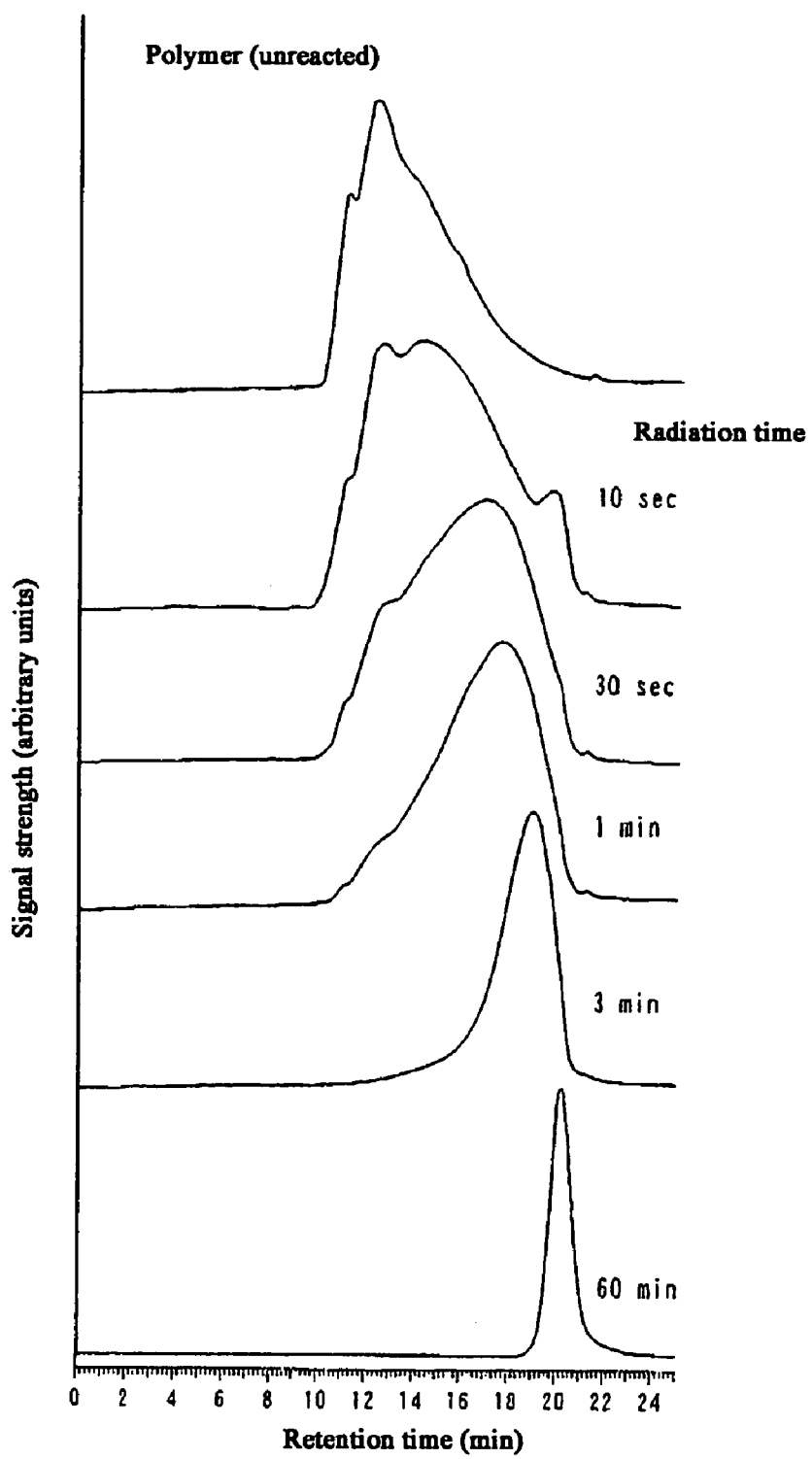
FIG. 3 shows changes in the GPC (gel permeation chromatography) curves of a diacetylene polymer versus the irradiation time of laser light (wherein the excitation wavelength is 775 nm, the intensity is 40 mW and the detecting wavelength is 350 nm).

FIG. 3 shows a GPC chart of a decomposition product in the case of irradiating a chloroform solution of a 1,4-di-substituted diacetylene [a compound represented by R—C≡C—C≡C—R', wherein R and R' represent (CH$_2$)$_4$ OCONHCH$_2$COOC$_2$H$_5$, abbreviated as 4BCMU] polymer (abbreviated as Poly-4BCMU) with light having a wavelength of 775 nm and at an intensity of 40 mW using a wavelength-tunable femtosecond laser.

The vertical axis represents absorption at a wavelength of 350 nm, while the horizontal axis represents retention time.

Furthermore, retention time refers to the amount of time the sample molecules are retained in the GPC column from the time of injection to the time of detection, and is a function of the interaction with the network structure of the gel filled into the column. Retention time becomes shorter the larger the molecular weight, and the sample is eluted more slowly the smaller the molecular weight.

Figure 4:
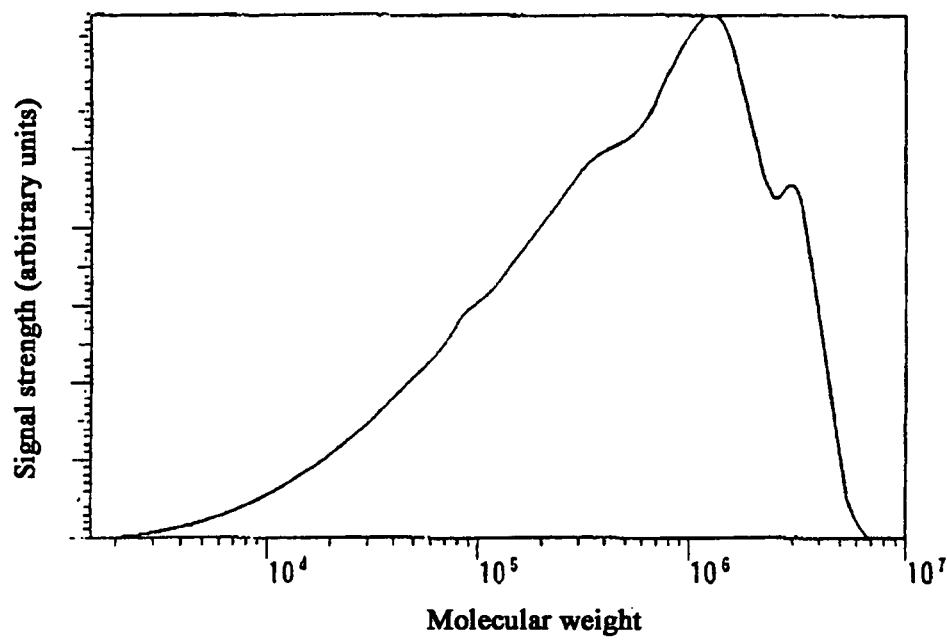
FIG. 4 shows the molecular weight distribution of polydiacetylene prior to degradation.

As shown in FIG. 4, the molecular weight of the 1,4-di-substituted diacetylene polymer prior to photodegradation is within the range of about 10,000 to about 4 million, and average degree of polymerization covers a wide range of about 20 to 8,800, and the dispersivity of the molecular weight (Mw/Mn) also demonstrates a wide distribution of 9.50.

In looking at the dependency of molecular weight distribution on radiation time in the case of having irradiated this polymer solution with laser light at 775 nm, the degradation reaction of the 1,4-di-substituted diacetylene polymer can be determined to not involve a sequential elimination reaction from the end of the polymer, but rather random scission of the polymer main chain. As a result, the molecular weight is ultimately reduced to 2,000 to 3,000, the average degree of polymerization is reduced to a narrow range of about 4 to 6, and the dispersivity of the molecular weight (Mw/Mn) demonstrates a narrow molecular weight distribution of 1.1 to 2.0, thereby indicating that the polymer has been decomposed into low molecular weight polymers, or oligomers.

This photodegradation reaction is dependent on light intensity, a characteristic of the two-photon absorption process, and not only does the reaction accelerate with light intensity, but a tendency is also observed in which the shape of the molecular weight distribution curve of the decomposition product is also affected by light intensity.

Thus, in order to obtain a diacetylene polymer or oligomer having a target average degree of polymerization and molecular weight distribution, it is imperative to select the wavelength, intensity and radiation time of the radiated laser light in consideration of the concentration of the polymer solution and volume of the reaction vessel.

Experimental Example 2

Figure 5:
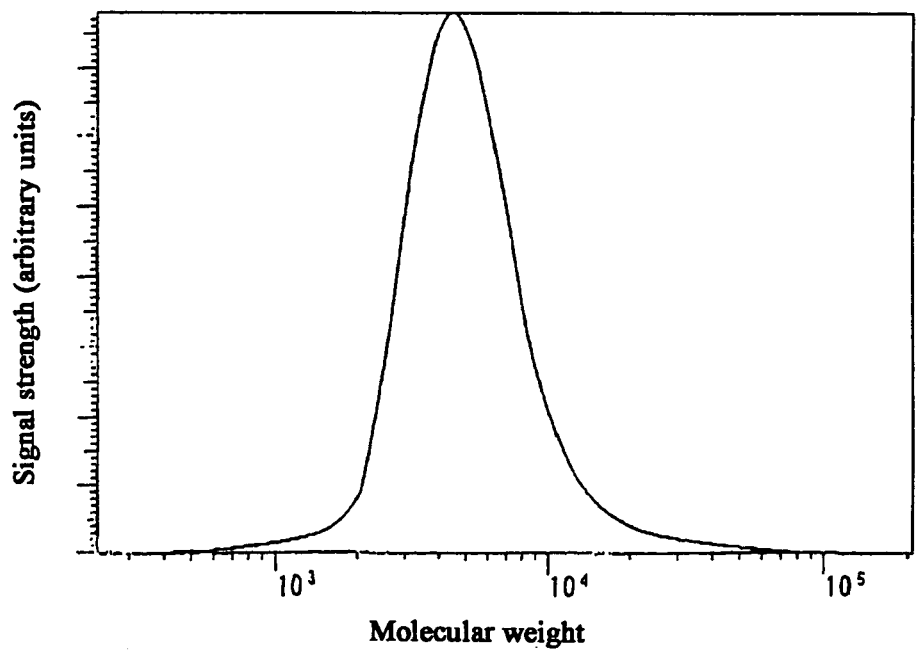
FIG. 5 shows the molecular weight distribution of a reaction product resulting from irradiation with laser light (wherein the wavelength is 775 nm, the intensity is 300 mW, and the irradiation time is 1 minute).

A chloroform solution of Poly-4BCMU (concentration: 100 mg/100 ml) was placed in a quartz cell having a diameter of the light receiving surface of 3.5 mm and an optical path length of 10 mm, and after irradiating for 1 minute at room temperature with light from a wavelength-tunable femtosecond laser (wavelength: 775 nm, intensity: 300 mW), the molecular weight distribution of the reaction product were determined as shown in FIG. 5.

The ratio of Mw/Mn as calculated on the basis of a calibration curve prepared using mono-dispersed polystyrene standard samples is 1.55.

Figure 6:
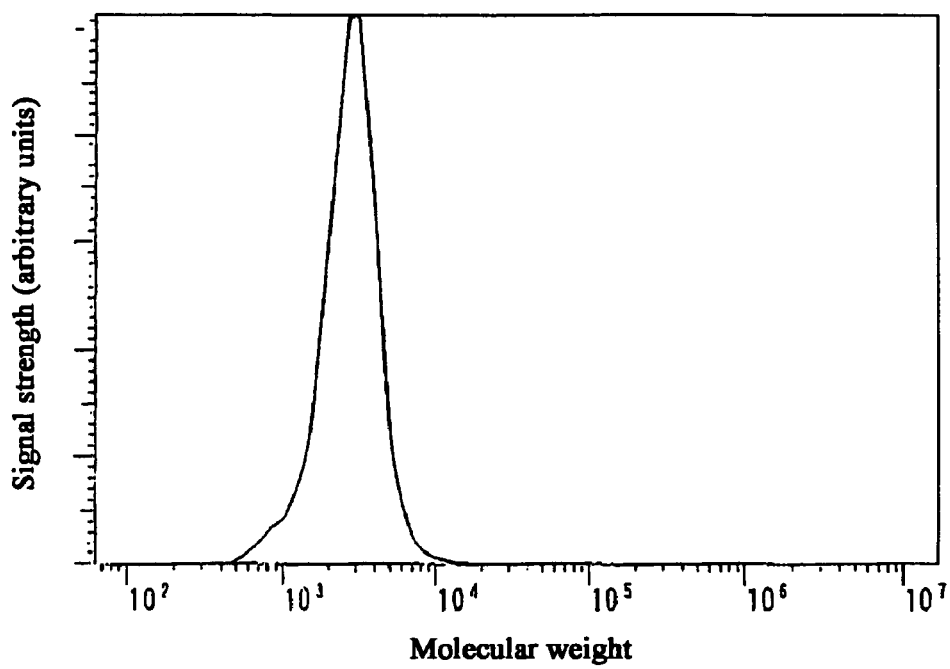
FIG. 6 shows the molecular weight distribution of a reaction product resulting from irradiation with laser light (wherein the wavelength is 775 nm, the intensity is 300 mW, and the irradiation time is 10 minutes).

When the radiation time was increased to 10 minutes under the same conditions for wavelength and intensity of the irradiated light, the ratio of Mw/Mn representing molecular weight distribution becomes 1.19, indicating a narrow distribution, as shown in FIG. 6.

Since the number average molecular weight based on polystyrene is 2,248, the average degree of polymerization is able to be evaluated as 4.

Experimental Example 3

A chloroform solution of Poly-4BCMU (concentration: 100 mg/100 ml) was irradiated for 60 minutes with light from a wavelength-tunable femtosecond laser (wavelength: 800 nm, intensity: 15 mW) combining with the use of a beam expanding lens using a quartz cell having a diameter of the light receiving surface of 8 mm and an optical path length of 10 mm.

Figure 7:
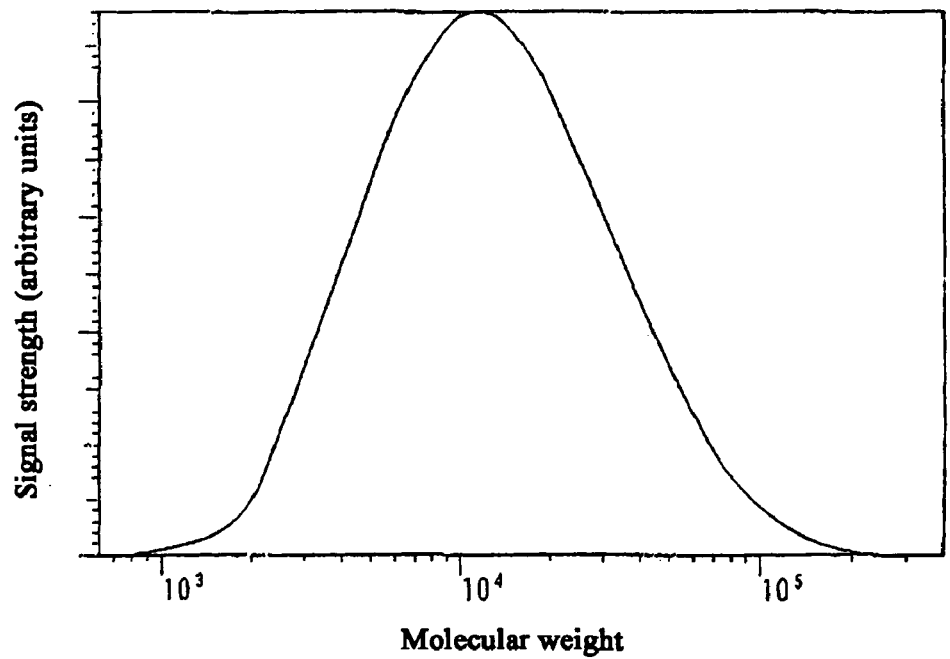
FIG. 7 shows the molecular weight distribution of a reaction product resulting from irradiation with laser light (wherein the wavelength is 800 nm, the intensity is 15 mW, and the irradiation time is 60 minutes).

As a result of GPC measurement of the reaction product, since the number average molecular weight (Mn) on the basis of polystyrene is 8,243, the average degree of polymerization is able to be evaluated as 16. The ratio of Mw/Mn that represents molecular weight distribution was 2.33 as shown in FIG. 7.

Experimental Example 4

A chloroform solution of Poly-4BCMU (concentration: 100 mg/100 ml) was irradiated for 60 minutes with light from a wavelength-tunable femtosecond laser (wavelength: 900 nm, intensity: 15 mW) combining the use of a beam expanding lens using a quartz cell having a diameter of the light receiving surface of 8 mm and an optical path length of 10 mm.

Figure 8:
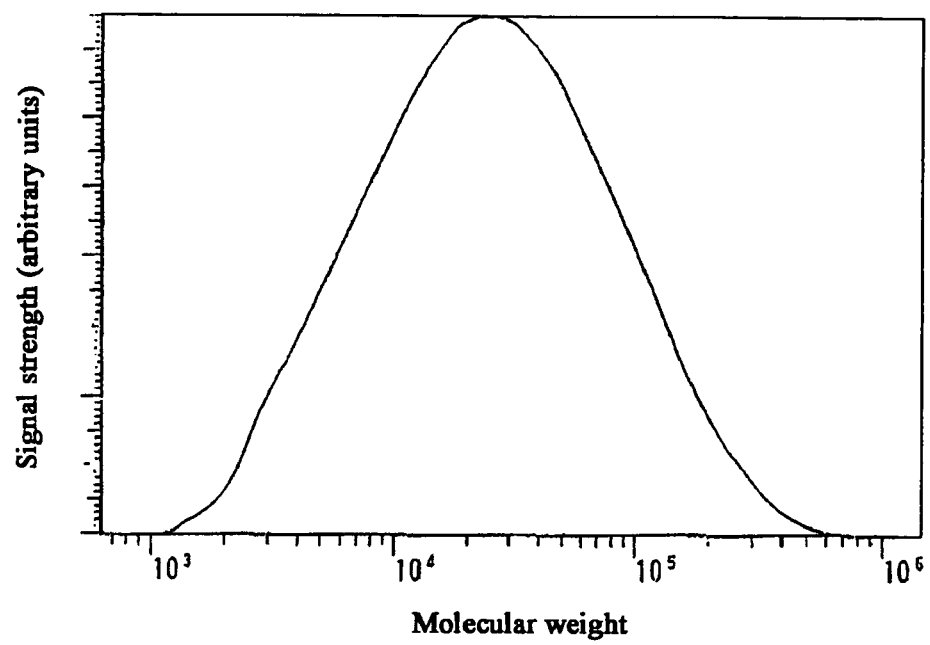
FIG. 8 shows the molecular weight distribution of a reaction product resulting from irradiation with laser light (wherein the wavelength is 900 nm, the intensity is 15 mW, and the irradiation time is 60 minutes).

According to the results of GPC measurement of the reaction product, since the number average molecular weight (Mn) on the basis of polystyrene is 12,350, the average degree of polymerization is able to be evaluated as about 24. The ratio Mw/Mn that represents molecular weight distribution was 3.65 as shown in FIG. 8.

Experimental Example 5

Figure 9:
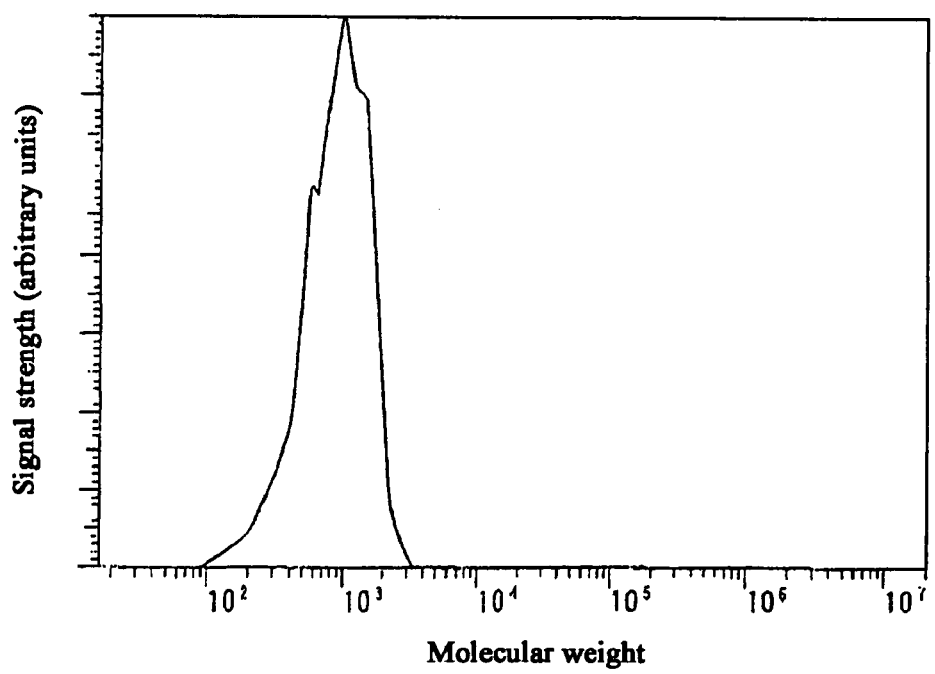
FIG. 9 shows the molecular weight distribution of a reaction product resulting from irradiation with laser light (wherein the wavelength is 387.5 nm, the intensity is 90 mW, and the irradiation time is 60 minutes).

The molecular weight distribution of the reaction product is shown in FIG. 9 in the case of placing a chloroform solution of Poly-4BCMU (concentration: 100 mg/100 ml) in a quartz cell having a diameter of the light receiving surface of 3.5 mm and an optical path length of 10 mm, and irradiating for 10 minutes with light having a wavelength of 387.5 nm in the single photon absorption region of polydiacetylene, using a wavelength-tunable femtosecond laser.

As is clear from FIG. 9, although the molecular weight of the reaction product is 5,000 or less in the case the irradiated light has a wavelength of 387.5 nm in the single photon absorption region, it is shown that there are cases in which substances having a low molecular weight of 1,000 or lower are contained in a portion thereof.

However, the formation of such a reaction product having a molecular weight of 1,000 or lower can be avoided as much as possible by setting the intensity and radiation time of the irradiated light equal to or less than constant values.

Experimental Example 6

Figure 10:
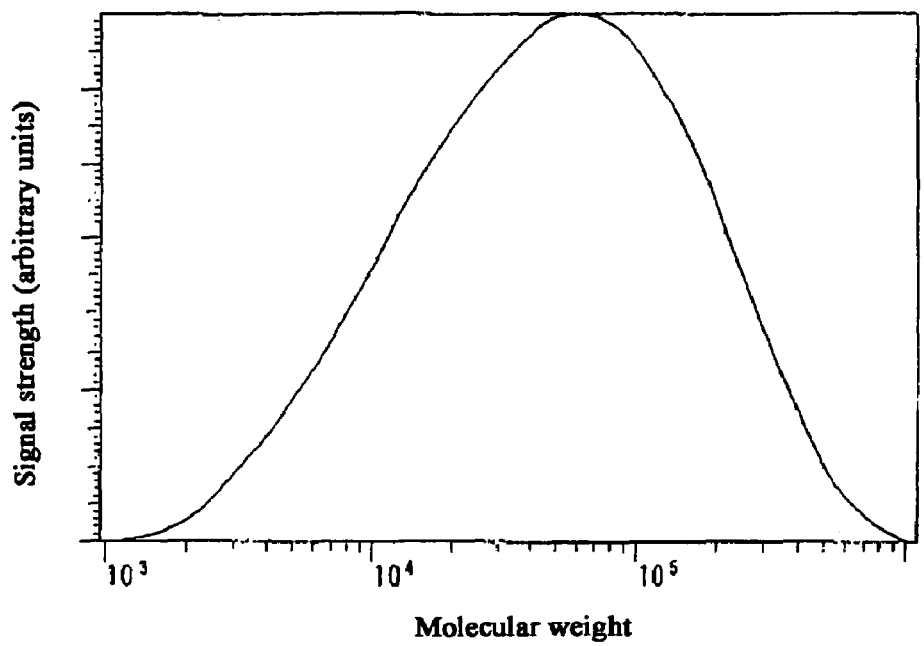
FIG. 10 shows the molecular weight distribution of a reaction product following heat treatment for 30 minutes at 150° C.
Figure 11:
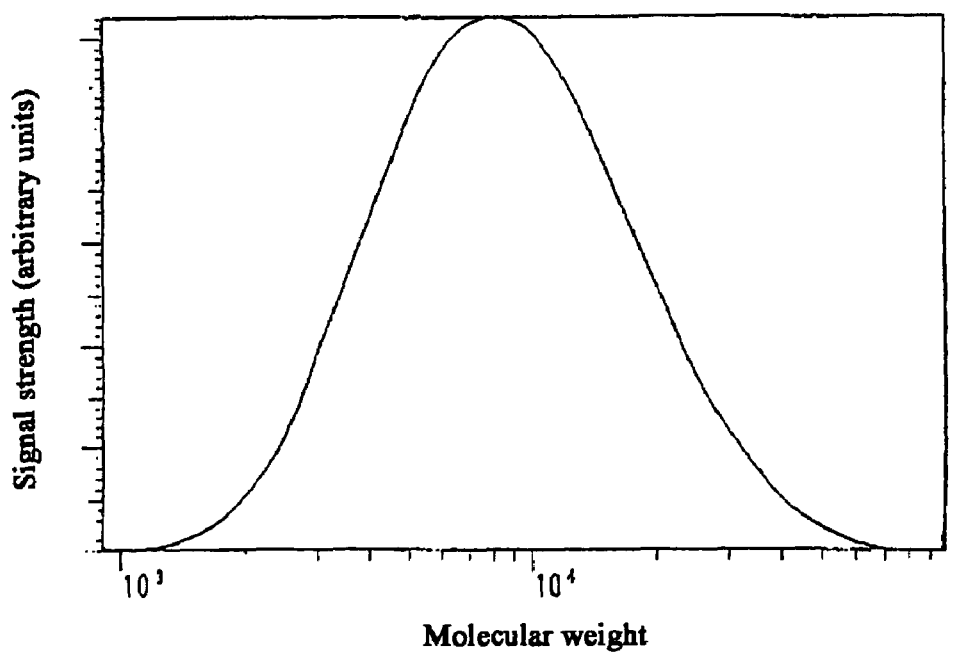
FIG. 11 shows the molecular weight distribution of a reaction product following heat treatment for 60 minutes at 150° C.

1-methyl-2-pyrrolidone solutions of Poly-4BCMU (concentration: 100 mg/100 ml) were placed in glass vessels with stoppers and held at a temperature of 150° C. for 30 minutes and 60 minutes followed by determination of the molecular weight distributions of the reaction products as shown in FIGS. 10 and 11.

Since the number average molecular weight (Mn) of the reaction product 30 minutes after reaction is 20,700, the average degree of polymerization can be evaluated as 48 and the ratio of Mw/Mn that represents molecular weight distribution is 4.11. Since the number average molecular weight (Mn) of the reaction product after 60 minutes is 6,649, the average degree of polymerization can be evaluated as 14, and the ratio of Mw/Mn that represents molecular weight distribution was 1.58.

All of the aforementioned Experimental Examples 1 to 6 were carried out on Poly-4BCMU.

However, since the average degree of polymerization is affected by the strength of the carbon bonds that form the main chain even in the case of using other substituents for organic group substituents R and R' of the present polymer, experimental values similar to the case of Poly-4BCMU are expected to be obtained, and this generally applies in the same manner to the ratio Mw/Mn that represents molecular weight distribution.

Experimental Example 7

The present polymer obtained according to the aforementioned method (1) or (2) was dissolved in a polar solvent such as 1-methyl-2-pyrrolidone followed by preparing composite compositions by mutually melting with a transparent resin such as polystyrene, polymethyl methacrylate or polycarbonate, or by adding an inorganic polymer obtained by a polycondensation reaction of a metal alkoxide typically represented by alkoxysilane.

As a result of coating these compositions onto a glass substrate, heating for 60 minutes at 100° C. and observing the cured film with an optical microscope, the present polymer produced by the photodegradation reaction of (1) or the thermal degradation of (2) were confirmed to demonstrate satisfactory compatibility with the transparent resin or matrix materials such as the inorganic polymer obtained by a polycondensation reaction of alkoxysilane.

Experimental Example 8

A uniformly coated surface was obtained as a result of coating the composite composition with a matrix material produced in Experimental Example 7 onto a transparent substrate made of glass, quartz and so forth or the surface of glass microspheres by spin coating, dipping and so forth.

The surface layer resulting from the aforementioned composition was confirmed to demonstrate satisfactory transmittance overall.

INDUSTRIAL APPLICABILITY

The present invention makes it possible for the first time to prepare the present polymer by photodecomposition or thermal decomposition in which number average molecular weight, and even average degree of polymerization based on said number average molecular weight, are controlled within a predetermined range, and in which molecular weight distribution is also controlled within a predetermined range, the preparation of which by a polymerization reaction was previously considered to be impossible.

Although the present polymer according to the present invention constitutes a novel group of substances, the present polymer can be expected to demonstrate superior processability by controlling the average degree of polymerization and molecular weight distribution to within predetermined ranges, while also having superior optical characteristics such as non-linear optical susceptibility and particularly superior transparency similar to previous high molecular weight 1,4-di-substituted diacetylene polymers.

Consequently, the present polymers along with the aforementioned composite compositions in which they are used can be expected to demonstrate usefulness in a wide range of fields including electronics, optoelectronics and photonics.

What is claimed is:

1. A process for producing a 1,4-di-substituted diacetylene polymer comprising the step of irradiating a solution consisting essentially of dissolved 1,4-di-substituted diacetylene polymer in a polar solvent with a concentration of 10 to 500 mg of 1,4-disubstituted diacetylene polymer/100 ml of polar solvent, with laser light having a wavelength within the range of 250 to 1200 nm, to cause a photodegradation reaction of said polymer, wherein the irradiation time is from 10 seconds to 180 minutes; and wherein said 1,4-disubstituted diacetylene polymer produced by the process is soluble in an organic solvent and is composed of repeating units represented by the general formula $=CR-C\equiv C-CR'=$, (wherein R and R' represent identical or different monovalent organic substituents,) and has an average degree of polymerization of 4 to 200 and a ratio (Mw/Mn) of weight average molecular weight (Mw) to number average molecular weight corresponding to said average degree of polymerization (Mn) of 1.1 to 5.0, wherein the organic substituents R and R' are selected from any of the following:

$(CH_2)_m OCONHCH_2COOC_nH_{2n+1}$ (wherein m represents an integer within the range of 3 to 6, and n represents an integer within the range of 1 to 10), $(CH_2)_m CONHCH_2COOC_nH_{2n+1}$ (where in m represents an integer within the range of 3 to 6, and n represents an integer within the range of 1 to 10), $(CH_2)_m OSO_2C_6H_4CH_3$ (wherein m represents an integer within the range of 3 to 6) and $(CH_2)_m OCONHCH_2CONHC_nH_{2n+1}$ (wherein m represents an integer within the range of 3 to 6, and n represents an integer within the range of 1 to 10).

2. A process for producing a 1,4-di-substituted diacetylene polymer comprising the step of heating a solution consisting essentially of dissolved 1,4-di-substituted diacetylene polymer in a polar solvent with a concentration of 10 to 500 mg of 1,4-disubstituted diacetylene polymer/100 ml of polar solvent to a temperature of 100 to 300° C. to cause thermal degradation of said polymer, wherein the heating time is from 30 minutes to 5 hours; and wherein said 1,4-disubstituted diacetylene polymer produced by the process is soluble in an organic solvent and is composed of repeating units represented by the general formula $=CR-C\equiv C-CR'=$, (wherein R and R' represent identical or different monovalent organic substituents,) and has an average degree of polymerization of 4 to 200 and a ratio (Mw/Mn) of weight average molecular weight (Mw) to number average molecular weight corresponding to said average degree of polymerization (Mn) of 1.1 to 5.0, wherein the organic substituents R and R' are selected from any of the following:

$(CH_2)_m OCONHCH_2COOC_nH_{2n+1}$ (wherein m represents an integer within the range of 3 to 6, and n represents an integer within the range of 1 to 10), $(CH_2)_m OCONHCH_2COOC_nH_{2n+1}$ (where in m represents an integer within the range of 3 to 6, and n represents an integer within the range of 1 to 10), $(CH_2)_m OSO_2C_6H_4CH_3$ (wherein m represents an integer within the range of 3 to 6) and $(CH_2)_mOCONHCH_2CONHC_nH_{2n+1}$ (wherein m represents an integer with the range of 3 to 6, and n represents an integer within the range of 1 to 10).

3. A 1,4-disubstituted diacetylene polymer which is produced according to the process of claim 1.

4. A 1,4-disubstituted diacetylene polymer which is produced according to the process of claim 2.

5. A composite composition in which the 1,4-di-substituted diacetylene polymer according to claim 1 is compatible with a transparent sheet.

6. A composite composition in which the 1,4-di-substituted diacetylene polymer according to claim 2 is compatible with a transparent sheet.

7. The composite composition as claimed in claim 5 wherein the transparent sheet is selected from polyester, polycarbonate, polyurethane, polyamide, polysulfone, and polycyclopentadiene.

8. The composite composition as claimed in claim 6 wherein the transparent sheet is selected from polyester, polycarbonate, polyurethane, polyamide, polysulfone, and polycyclopentadiene.

9. The composite composition as claimed in claim 5 wherein the transparent sheet is selected from an aromatic vinyl resin and acrylic resin.

10. The composite composition as claimed in claim 6 wherein the transparent sheet is selected from an aromatic vinyl resin and acrylic resin.

11. The composite composition as claimed in claim 5 wherein the transparent sheet is selected from photosetting resin and thermosetting resin.

12. The composite composition as claimed in claim 6 wherein the transparent sheet is selected from photosetting resin and thermosetting resin.

13. A composite composition with an inorganic polymer obtained by reacting the 1,4-di-substituted diacetylene polymer according to claim 3 in a polycondensation reaction with a metal alkoxide represented by alkoxysilane.

14. A composite composition with an inorganic polymer obtained by reacting the 1,4-di-substituted diacetylene polymer according to claim 4 in a polycondensation reaction with a metal alkoxide represented by alkoxysilane.

15. An optical part obtained by using a film, sheet or three-dimensional molding based on the composition according to claim 13 and in which the 1,4-di-substituted diacetylene polymer is compatible with a transparent sheet.

16. An optical part obtained by using a film, sheet or three-dimensional molding based on the composition according to claim 14 and in which the 1,4-di-substituted diacetylene polymer is compatible with a transparent sheet.

17. An optical part obtained by using the composite composition according to claim 5 as a surface layer.

18. An optical part obtained by using the composite composition according to claim 6 as a surface layer.

19. The optical part according to claim 17 wherein the composite composition is used in transparent sheets, microspherical resonators and optical waveguides.

20. The optical part according to claim 18 wherein the composite composition is used in transparent sheets, microspherical resonators and optical waveguides.

21. A process for producing the 1,4-disubstituted di-diacetylene polymer as claimed in claim 1 wherein laser light has a wavelength with the range of 550 to 900 nm.

22. A process according to claim 1, wherein said dissolved 1,4-di-substituted diacetylene polymer in a polar solvent has a concentration of 50 to 200 mg of 1,4-disubstituted diacetylene polymer/100 ml of polar solvent.

23. A process according to claim 2, wherein said dissolved 1,4-di-substituted diacetylene polymer in a polar solvent has a concentration of 50 to 200 mg of 1,4-disubstituted diacetylene polymer/100 ml of polar solvent.

* * * * *